United States Patent
Bueno et al.

(10) Patent No.: US 6,395,055 B1
(45) Date of Patent: May 28, 2002

(54) METHOD FOR THE DIRECT REDUCTION OF IRON OXIDES

(75) Inventors: Henry Rafael Bueno; David Rabascall, both of Puerto Ordaz (VE); Gianpietro Benedetti, Campoformido (IT)

(73) Assignee: Danieli & C. Officine Meccaniche SpA, Buttrio (IT)

( * ) Notice: Subject to any disclaimer, the term of this patent is extended or adjusted under 35 U.S.C. 154(b) by 0 days.

(21) Appl. No.: 09/457,714

(22) Filed: Dec. 10, 1999

(30) Foreign Application Priority Data

Dec. 11, 1998 (IT) .......................... UD98A0212

(51) Int. Cl.[7] .............................................. C21B 13/14
(52) U.S. Cl. ............................................ 75/495; 75/496
(58) Field of Search .................................. 75/496, 495

(56) References Cited

U.S. PATENT DOCUMENTS

| | | | |
|---|---|---|---|
| 4,054,444 A | | 10/1977 | Clark et al. |
| 4,270,739 A | | 6/1981 | Ahrendt et al. |
| 4,374,585 A | | 2/1983 | Papst et al. |
| 4,804,408 A | * | 2/1989 | Puhringer et al. .......... 266/160 |
| 4,955,587 A | * | 9/1990 | Sulzbacher et al. ......... 266/160 |
| 5,069,716 A | * | 12/1991 | Dam G et al. .............. 266/160 |
| 5,407,460 A | | 4/1995 | Bueno et al. |
| 5,840,097 A | | 11/1998 | Dam |
| 6,027,545 A | * | 2/2000 | Villarreal-Trevino ........ 75/495 |

FOREIGN PATENT DOCUMENTS

EP 262353 4/1988

* cited by examiner

*Primary Examiner*—Melvyn Andrews
(74) *Attorney, Agent, or Firm*—Antonelli, Terry, Stout & Kraus, LLP

(57) ABSTRACT

Method for the direct reduction of mineral iron inside a vertical reduction furnace (10) of the type with a gravitational load, wherein the reducing gas flows in counter-flow with respect to the material introduced into the furnace, comprising the following steps: the mineral iron is fed from above into the furnace (10), a mixture of high temperature gas consisting of reducing gas based on $H_2$ and CO is injected, and the reduced mineral is removed from the furnace (10). The mixture of gas is introduced into at least a zone (14) of the furnace (10) and consists of the process gas, which emerges from the same furnace, and of additional gas arriving from an outside reforming circuit.

13 Claims, 5 Drawing Sheets

METHOD FOR THE DIRECT REDUCTION OF IRON OXIDES

FIELD OF THE INVENTION

This invention concerns a process to produce metallic iron starting from mineral iron, wherein the iron is present in the form of oxides, and the relative apparatus which comprises a reduction furnace which may have one or more inlets for the reducing gas and inside which the process of direct reduction of the iron (DRI) is carried out. The reducing gas is obtained by mixing a part of the process gas, which emerges from the reduction furnace, with additional gas arriving from an outside reforming circuit.

BACKGROUND OF THE INVENTION

The state of the art includes processes of direct reduction which use the injection of hydrocarbons into the current of reducing gas to allow the reaction of reforming the methane in the furnace with the $H_2O$ and $CO_2$ in the gas; there are also known processes of direct reduction which use the injection of hydrocarbons with C>5 directly into the furnace in the zone between the injection of the reducing gas and the outlet from above of the burnt gas.

From the following patent documents other processes are known for the direct reduction of mineral iron:

| | | |
|---|---|---|
| US-A-2,189,260, | US-A-3,601,381, | US-A-3,748,120, |
| US-A-3,749,386, | US-A-3,764,123, | US-A-3,770,421, |
| US-A-4,054,444, | US-A-4,173,465, | US-A-4,188,022, |
| US-A-4,234,169, | US-A-4,201,571, | US-A-4,270,739, |
| US-A-4,374,585, | US-A-4,528,030, | US-A-4,556,417, |
| US-A-4,720,299, | US-A-4,900,356, | US-A-5,064,467, |
| US-A-5,078,788, | US-A-5,387,274, and | US-A-5,407,460. |

The state of the art also includes processes wherein the hot metallic iron is produced in a reduction furnace of the shaft type, with a vertical and gravitational flow of the material, which is subsequently sent to the melting furnace by means of a closed pneumatic transport system in an inert atmosphere.

SUMMARY OF THE INVENTION

The method according to the invention consists in bringing into contact the mineral iron, of various granulometry, with a feed gas in a reduction furnace of the shaft type, wherein both the gas and the material are fed continuously, so that a vertical and gravitational flow of material is created and the direct reduction of the mineral is achieved. The material may be discharged from the reactor either cold or preferably hot to be sent subsequently to a melting furnace or so that it may be converted into hot briquette iron (HBI) or cooled and converted into direct reduction iron (DRI).

The reduction furnace is equipped with means to feed the mineral iron and means to discharge the reduced metallic iron; it is equipped with at least one inlet collector to inject the reducing gas in correspondence with a reduction zone or reactor inside the furnace.

The reducing gas sent into the reactor contains hydrocarbons injected into the current after the partial combustion of the hydrogen and carbon monoxide with the oxygen and is obtained by mixing a part of the process gas, which exits from the reduction furnace, with additional gas arriving from an outside reforming circuit.

In a variant, the hydrocarbons are injected before the partial combustion is achieved, with the purpose of raising the temperature of the gas introduced into the reactor.

According to another variant, the hydrocarbons are at least partly injected into a zone between the reduction zone and the zone where the reduced material is discharged.

In all cases, the injected hydrocarbons cooperate in reducing the iron oxide (FeO) to metallic iron, generating more $H_2$ and CO.

The direct reduction of the iron oxides is achieved in two different continuous stages inside the reduction reactor.

In a particular embodiment, the furnace is provided with a first stage, defined as the pre-heating and pre-reduction stage, where the fresh iron oxides, that is, those just introduced into the furnace, come into contact with a mixture of reducing gas, consisting of partly burnt gas, arriving from the underlying part of the furnace and of fresh hot gas, that is, gas introduced from outside, arriving from a collector which brings fresh reducing gas and possibly $CH_4$ or other natural gas. This first stage takes place in a corresponding first zone arranged in the upper part of the furnace.

In the second stage, the reduction stage proper, the complete reduction of the iron oxides is achieved, due to the action on the oxides, already partly reduced in the first stage, of a mixture of reducing gas based on $H_2$ and CO and at least a hydrocarbon, preferably natural gas, injected in the median zone of the reduction reactor. This second stage takes place in a corresponding second zone arranged below the first zone.

The two inlets to the furnace through which the gas is introduced can be independently regulated both in the flow of fresh reducing gas and in the addition of natural gas in the current introduced.

Moreover, the inlet temperature of the two currents of reducing gas can be independently regulated by injecting $O_2$ before they enter the reduction reactor.

The oxidation reaction needed to raise the temperature of the gas leads to a change in the level of oxidation of the gas, from normal values of 0.04–0.08 to 0.06–0.15.

The following ratio is intended for the level of oxidation of the reducing gas:

$$Nox=(H_2O+CO_2)/(H_2O+CO_2+H_2+CO)$$

In the second reaction zone of the furnace, wherein the reduction of the iron oxides is completed, a gas is generated with a high content of $H_2$ and CO and with an oxidation level of between 0.15 and 0.25 due to the reduction reactions of the iron oxides with $H_2$, CO and $CH_4$.

Once this gas has left the second reaction zone, it enters the first reaction zone, located higher up, and mixes with the hot gas injected into the first zone to pre-heat and pre-reduce the iron oxides.

The gas emerging from the reduction reactor is partly recircled and partly used as fuel.

The recircled gas has a volume composition within the following fields:

| | | | |
|---|---|---|---|
| $H_2$ = 20–41%, | CO = 15–28%, | $CO_2$ = 15–25%, | $CH_4$ = 3–10%, |
| $N_2$ = 0–8%, | $H_2O$ = 2–7%. | | |

According to one characteristic of the invention, the gas feeding the reduction reactor consists of a mixture of natural gas, recircled gas, also known as process gas or top gas, which exits from the reactor itself, and reformed gas; the recircled gas is pre-heated to a temperature of between 650° C. and 950° C.; the gas emerging from the pre-heater is in turn mixed with fresh reformed gas and subsequently with air, or air enriched with oxygen, or pure oxygen, to carry out a partial combustion of the $H_2$ and CO in the reducing gas in order to raise the temperature to values of between 800° C. and 1150° C., preferably between 1000° C. and 1150° C.; and the oxidation level of the resulting gas feeding the furnace is between 0.06 and 0.15.

The methane represents between 6 and 20% in volume of the mixture of reducing gas.

When the feed gas comes into contact in the reduction zone with the hot, partly reduced material, which therefore consists partly of metallic iron and partly of iron oxides, a highly endothermic reaction is produced.

There is a also an endothermic reaction in the pre-heating and pre-reducing zone when the gas comes into contact with the iron oxide.

One advantage of this invention is that the first pre-heating and pre-reducing zone is extended, which allows to start the transformation of the Ematite ($Fe_2O_3$) into Wustite (FeO) more quickly.

The whole reactor works at a higher average temperature and above all which is constant along both zones, both the pre-reduction and reduction zones, encouraging a higher reaction speed, with a consequent effect of reducing consumption and increasing productivity.

In the case where the furnace has two inlets for the introduction of the reducing gas, the first inlet is located at a set distance (x) with respect to the second inlet, which is located in the median part of the furnace, in correspondence with the second reduction zone. This distance (x) is suitably between 1 and 6 meters, preferably between 2 and 4 meters, to encourage the reactions in the most suitable zone between the reducing gas and the iron oxides.

The first gas inlet also has the function of pushing the gases arriving from the second reduction zone towards the center of the furnace so as to create a uniform distribution of the gas in the section of the reactor.

According to a variant, there are multiple, or more than two, inlets for the reducing gas into the furnace. The first current of reducing gas is injected into the middle of the reactor, into the reduction zone proper, while the other currents are introduced into the zone between the injection of the first current of gas and the outlet of the burnt gas, in the upper part of the furnace. This intermediate zone will be called the pre-heating and pre-reducing zone for the iron oxide based material.

The flow of gas into the reactor thus composed allows to have the whole reduction and pre-reduction zone at as constant a temperature as possible, and to have a gas inside the furnace which always has a high reducing power, encouraging a greater productivity and a lower consumption of gas; this also allows to improve the final metalisation of the product.

In this way, moreover, the iron oxides arrive at the reduction zone already partly reduced, thus encouraging the completion of the final reduction reaction from FeO to Fe.

BRIEF DESCRIPTION OF THE DRAWINGS

These and other characteristics of the invention will become clear from the following description of some preferred forms of embodiment, given as a non-restrictive example with the aid of the attached Figures wherein:

FIG. 2 is a first variant of a furnace employed in the apparatus in FIG. 1a;

FIG. 4 shows a second variant of a furnace employed in the apparatus in FIG. 1a;

FIG. 6 shows another variant of the apparatus in FIG. 1a.

DETAILED DESCRIPTION OF PREFERRED EMBODIMENTS

Figure 1A:
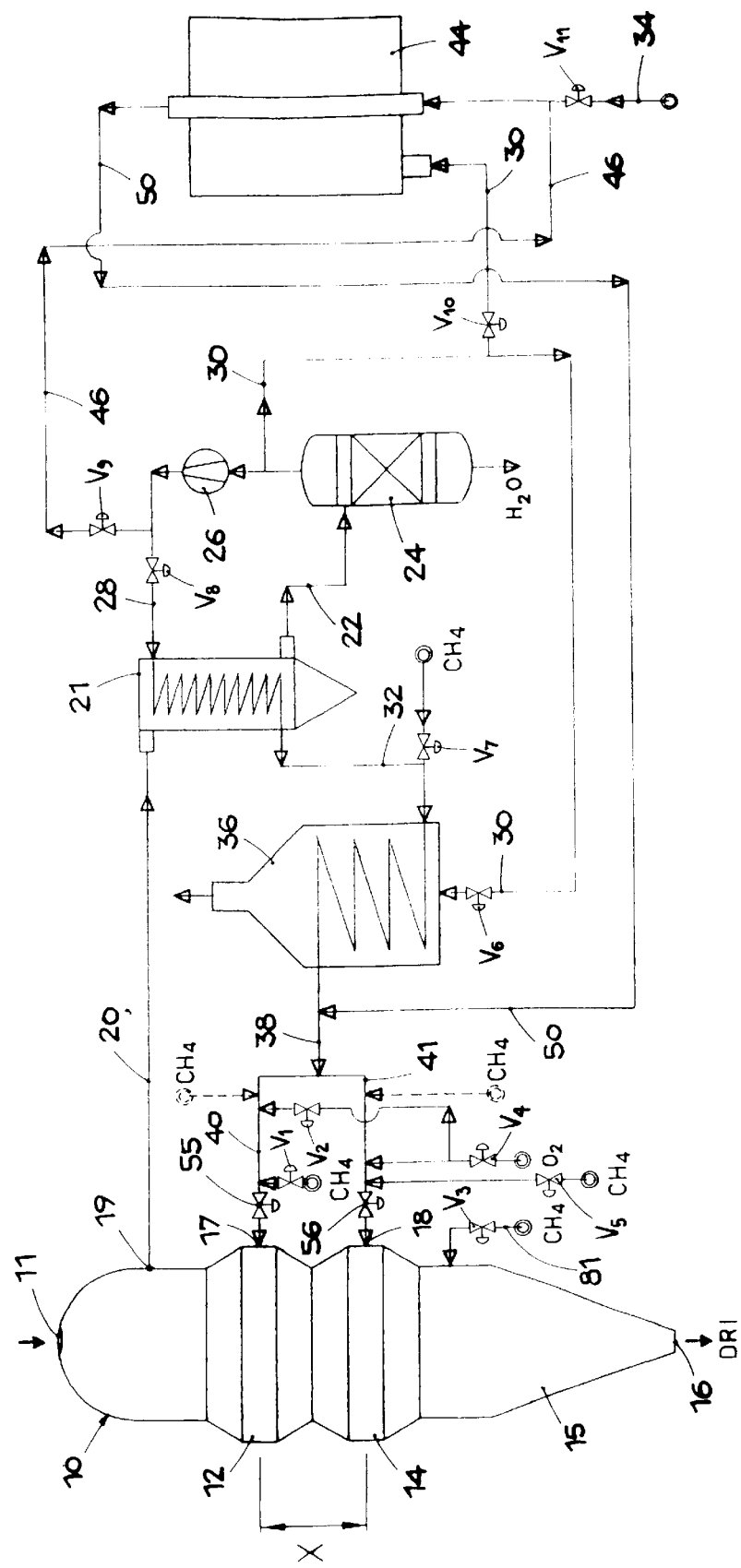
FIG. 1a shows in diagram form an apparatus for the direct reduction of iron oxides according to the invention in a first form of embodiment.

With reference to FIG. 1a, an apparatus for the direct reduction of iron oxides according to the invention comprises a reduction furnace of the shaft type or reduction reactor 10, comprising in turn an upper mouth 11 for feeding from above, through which the mineral (iron oxides) is able to be introduced, a first pre-heating and pre-reduction zone 12, a second zone, or median zone 14 wherein the final reduction reaction of the iron oxides takes place, and a lower zone, or discharge zone 15, shaped like a truncated cone, terminating at the bottom in a lower aperture 16 through which the iron is discharged.

The iron-based metal oxides are introduced into the reactor 10 in the form of pellets or crude mineral in the appropriate sizes; the iron contained therein is usually between 63% and 68% in weight.

At the end of the process according to the invention, the iron contained in the reduced material exiting from the reactor 10 is normally between 80% and 90% in weight.

In correspondence with the two zones 12 and 14 of the reactor 10 there are two independent inlets 17, respectively 18, through which a mixture of gas is suitable to be introduced, as will be described in greater detail hereafter.

In its upper part, above zone 12, the reactor 10 is provided with an aperture 19 through which the burnt gas or process gas exits. This gas normally has the following characteristics: composition: $H_2$=20–41%, CO=15–28%, $CO_2$=12–25%, $CH_4$=2–10%, $N_2$=0–8%, $H_2O$=2–15%; temperature between 500° C. and 700° C.; oxidation level between 0.3 and 0.50, preferably between 0.40 and 0.45; and a reduction ratio R of between 1 and 1.8 where reduction ratio is taken as:

$$R=(H_2+CO)/(H_2O+CO_2).$$

Figure 1B:
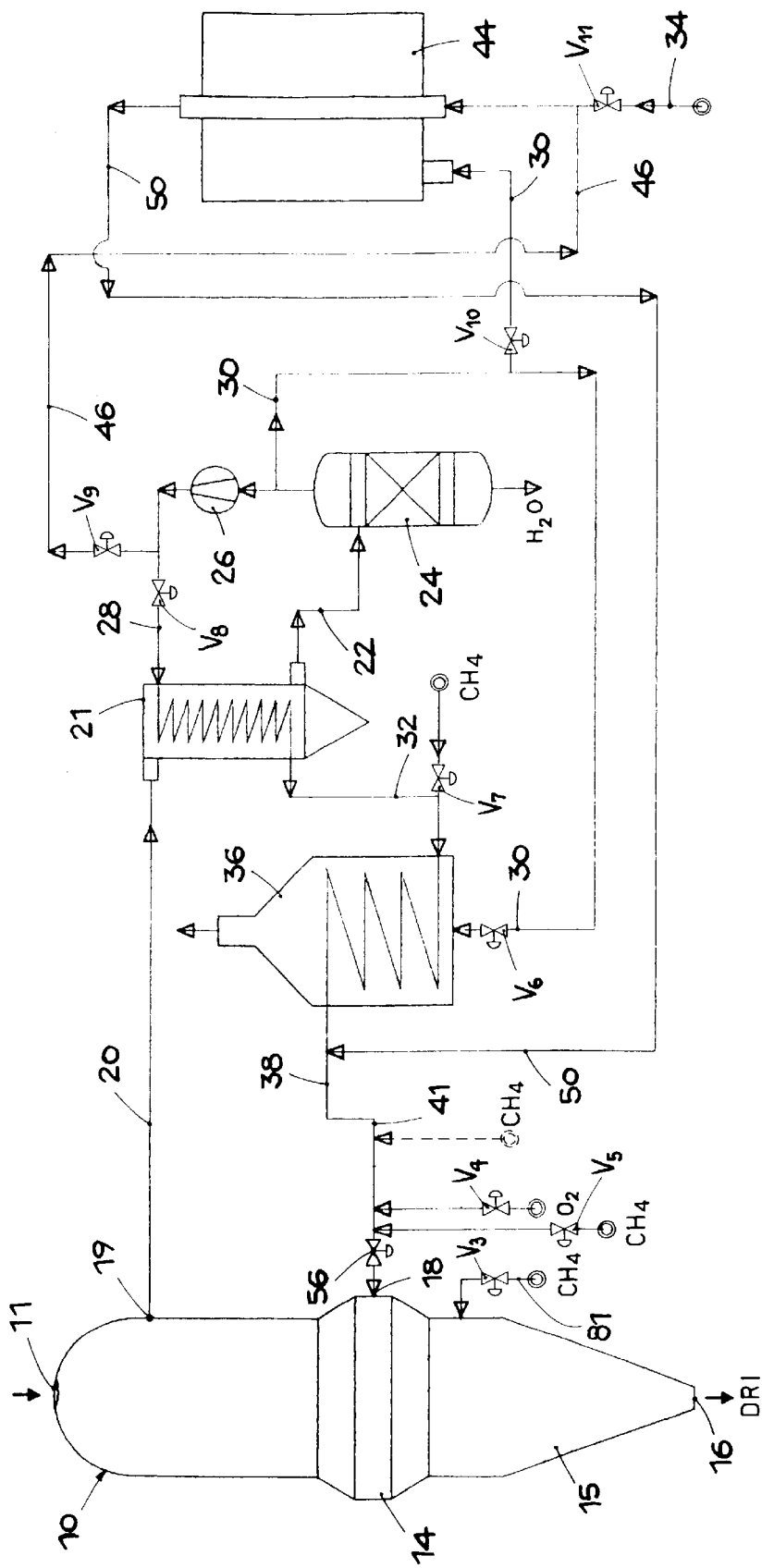
FIG. 1b shows in diagram form an apparatus for the direct reduction of iron oxides according to the invention in a second form of embodiment.

In the embodiment shown in FIG. 1b, the furnace 10 comprises only one reaction zone 14 and only one inlet 18 through which the reducing gas is injected into the furnace.

In both versions, that is, the one shown in FIG. 1a and the one shown in FIG. 1b, the burnt gas emerging from the reactor 10 is sent through a pipe 20 to a cooling unit 21, suitable to recover the heat which can be given up; from the cooling unit 21, through another pipe 22, it arrives at a cooling and condensing unit 24. In this unit 24 the burnt gas is washed in water at a temperature of between 40° C. and 65° C. and the quantity of water present in the gas itself is partly removed. The percentage of water remaining in the gas at outlet from the unit 24 is between 2% and 7%.

The gas at outlet from the unit 24 is sent through a pipe 30 partly to a pre-heater 36, partly to a catalytic reformer 44, to be used as fuel, and partly to a compressor 26.

The gas emerging from the compressor 26 is in turn used partly as a recircling gas and sent, through a pipe 28, inside the unit 21, and partly, through a pipe 46, mixed with a natural gas comprising methane ($CH_4$), or pure methane, arriving from a pipe 34 in a proportion of about 4:1 (that is to say, for every part of natural gas there are about four parts of gas arriving from the pipe 46) and introduced into the reformer 44 so that the reforming reaction of the methane ($CH_4$) with $H_2O$ and $CO_2$ can begin.

The part of gas which is sent to the unit 21 through the pipe 28 is pre-heated, and is then sent through a pipe 32 to the pre-heater 36, where it is further pre-heated to a temperature of between 650° C. and 950° C. $CH_4$ may also be injected into the pipe 32.

The gas emerging from the pre-heater 36, which has a delivery rate of between 600 $Nm^3$/ton DRI and 1500 $Nm^3$/ton DRI, is mixed in a pipe 38 with the gas arriving from the reformer 44 through a pipe 50.

The gas resulting from this mixture is divided into two parts and distributed into two pipes 40 and 41, connected to the inlets 17 and 18 of the furnace 10. The delivery of reducing gas is controlled in each zone 12, 14 by means of regulation valves 55 and 56.

Into each pipe 40 and 41 air is injected, or air enriched with oxygen or pure oxygen and natural gas in variable percentages, in order to achieve a partial combustion of the CO and the $H_2$ and raise the temperature of the gas.

A current of $CH_4$ or natural gas is injected into the gas before it is introduced into the reactor.

In a variant, shown by a line of dashes in FIGS. 1a and 1b, the $CH_4$ is injected before achieving the partial combustion, with the purpose of raising the temperature of the gas introduced into the reactor.

The $CH_4$ may also be introduced in a zone between the reduction zone 14 and the discharge cone of the material, through a pipe 81. In this case, before entering into the zone 14 where the reduction reactions are carried out, the $CH_4$ injected partially cools the reduced iron, before the latter is discharged.

Valves V1–V11 are located in correspondence with the different conduits of the plant so that the flow can be selectively controlled.

The resulting mixtures are then introduced into the reduction zone 14 and optionally into the pre-heating and pre-reduction zone 12.

With regard to the furnace 10 with two inlets (FIG. 1a), for each zone 12 and 14 the corresponding mixture of gas is regulated in an autonomous and independent manner.

To be more exact, the flow of gas in the first zone 12 is between 500 $Nm^3$/ton DRI and 800 $Nm^3$/ton DRI and enters the reduction reactor 10 with a temperature of between 800° C. and 1150° C., preferably between 1000° C. and 1150° C., while the flow of gas in the second zone 14 is between 1000 $Nm^3$/ton DRI and 1500 $Nm^3$/ton DRI and also enters the reduction reactor 10 with a temperature of between 800° C. and 1150° C., preferably between 1000° C. and 1150° C.

The consumption of oxygen, which is necessary to raise the temperature of the reducing gas from 650° C.–950° C. to 800° C.–1150° C., intended as pure oxygen plus that contained in the air, if air is also injected, is between 8 $Nm^3$/ton DRI and 60 $Nm^3$/ton DRI, preferably between 20 and 60 $Nm^3$/ton DRI.

The consumption of $CH_4$ is between 50 and 120 $Nm^3$/ton DRI, preferably between 90 and 110 $Nm^3$/ton DRI.

In volume the $CH_4$ represents between 6 and 20% of the mixture of reducing gas introduced into the reactor.

The reactions involved in the reduction zone 14 are as follows;

$$FeO+CH_4=Fe+2H_2+CO \qquad (1)$$

Simultaneously, in the same zone 14, the following reduction reactions take place with hydrogen and carbon monoxide:

$$FeO+H_2=Fe+H_2O \qquad (2)$$

$$FeO+CO=Fe+CO_2 \qquad (3)$$

The consequence of these endothermic reactions is that the temperature of the gas in the reduction zone decreases from 800° C.–1150° C. to 700° C.–900° C., yet still maintains the reaction temperature higher than in furnaces in the state of the art, and the gas leaving the reduction zone 14 has an oxidation level of between 0.15 and 0.35 and a reducing power of between 1.1 and 2.8.

The reactions involved in the pre-reduction zone 12 are as follows:

$$Fe_2O_3 + H_2 = 2FeO + H_2O \qquad (4)$$
$$Fe_2O_3 + CO = 2FeO + CO_2 \qquad (5)$$

In the lower zone 15, shaped like a truncated cone, it is also possible to introduce gas containing natural gas to control the final carbon in the hot reduced iron to values of between 1.5% and 3.0%.

Figure 2:
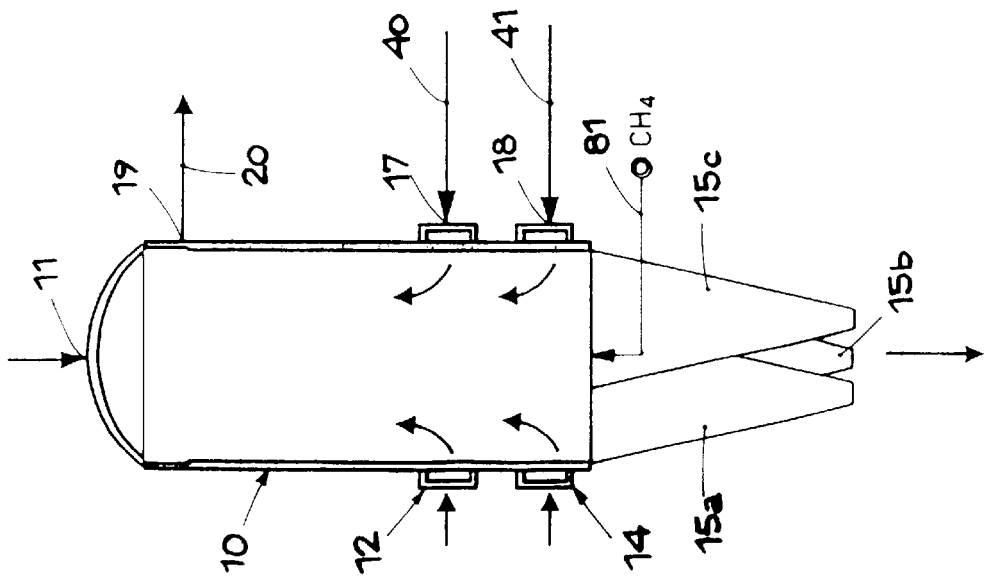

In a variant as shown in FIG. 2, instead of having a single lower part shaped like a truncated cone, the furnace 10 has at least two, and preferably three or four lower ends, shaped like a cone or truncated cone 15a, 15b and 15c, through which the reduced metallic iron is discharged in a controlled and independent manner. In this case the $CH_4$ may also be introduced by means of devices located on the zone of intersection of the truncated cone ends 15a, 15b and 15c, thus exploiting the geometric conformation of the system.

Figure 3:
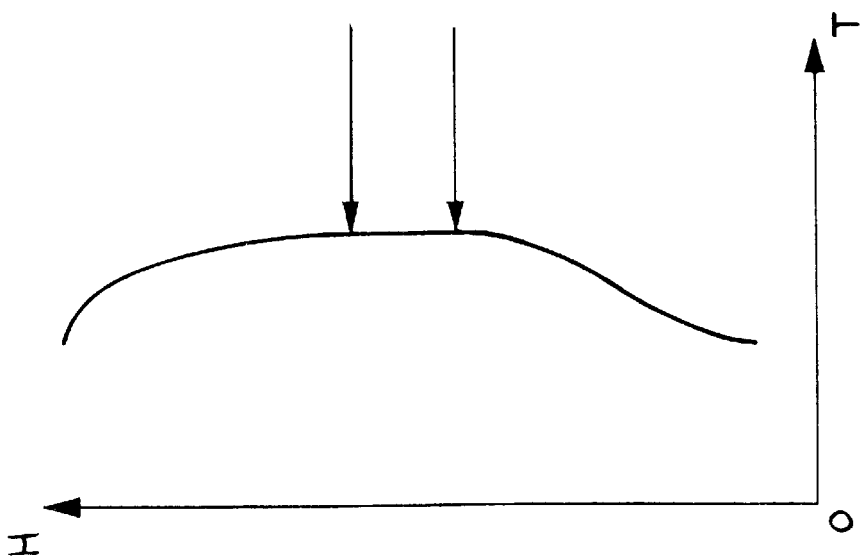
FIG. 3 is a diagram showing the temperature inside the furnace shown in FIGS. 1a and 2.

The development of the temperature inside the furnace 10, both in the version shown in FIG. 1a and also in the variant shown in FIG. 2, is shown in FIG. 3, from which it can be seen how the temperature is higher and more constant in the segment affected by the two zones 12 and 14.

Figure 4:
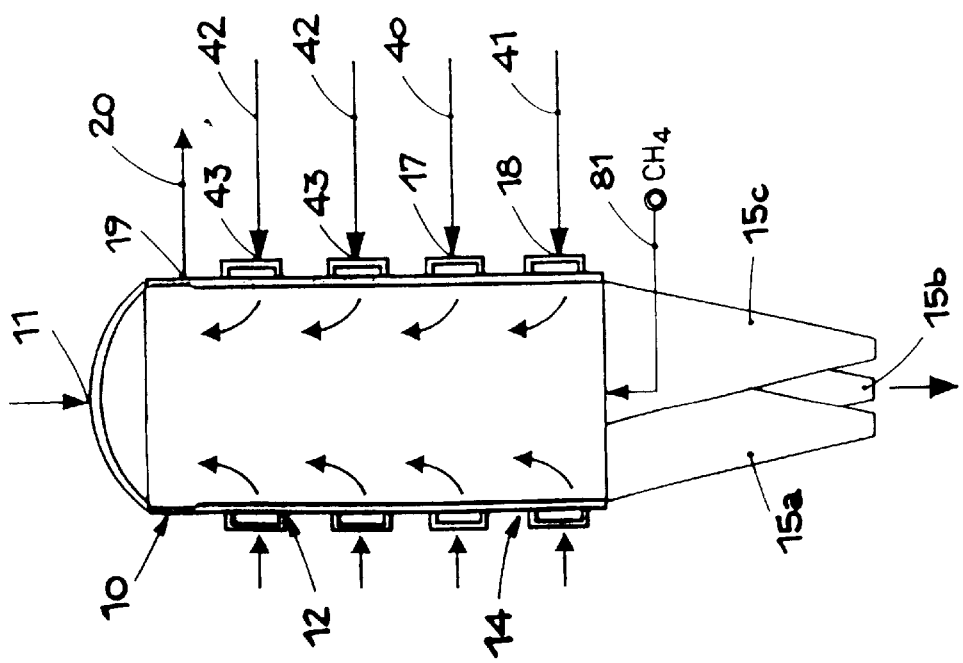

According to another variant shown in FIG. 4, instead of having two inlets to introduce reducing gas, the furnace 10 is provided with a plurality of inlets, more than two. In this case a first current of gas is introduced into the lower inlet 18 through the pipe 41, a second current of gas is introduced into the inlet 17 through the pipe 40 and other currents of gas, each of which can be autonomously regulated, are introduced through pipes 42 and corresponding inlets 43 arranged between the inlet 17 and the upper aperture 19.

Figure 5:
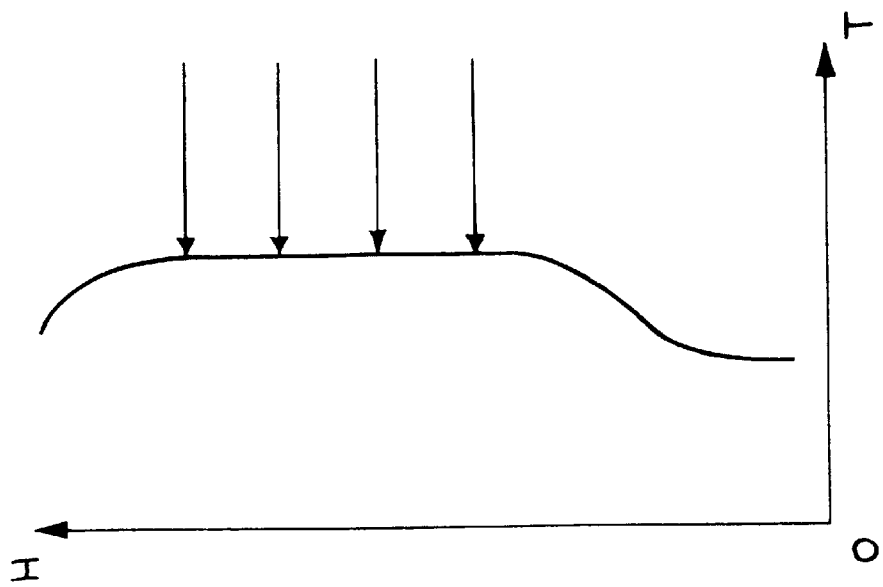
FIG. 5 is a diagram showing the temperature inside the furnace shown in FIG. 4.

The development of the temperature inside the furnace 10, in the variant shown in FIG. 4, is shown in the diagram in FIG. 5, from which it can be seen how the temperature is higher and more constant in the whole segment affected by the pipes 40, 41 and 42.

Figure 6:
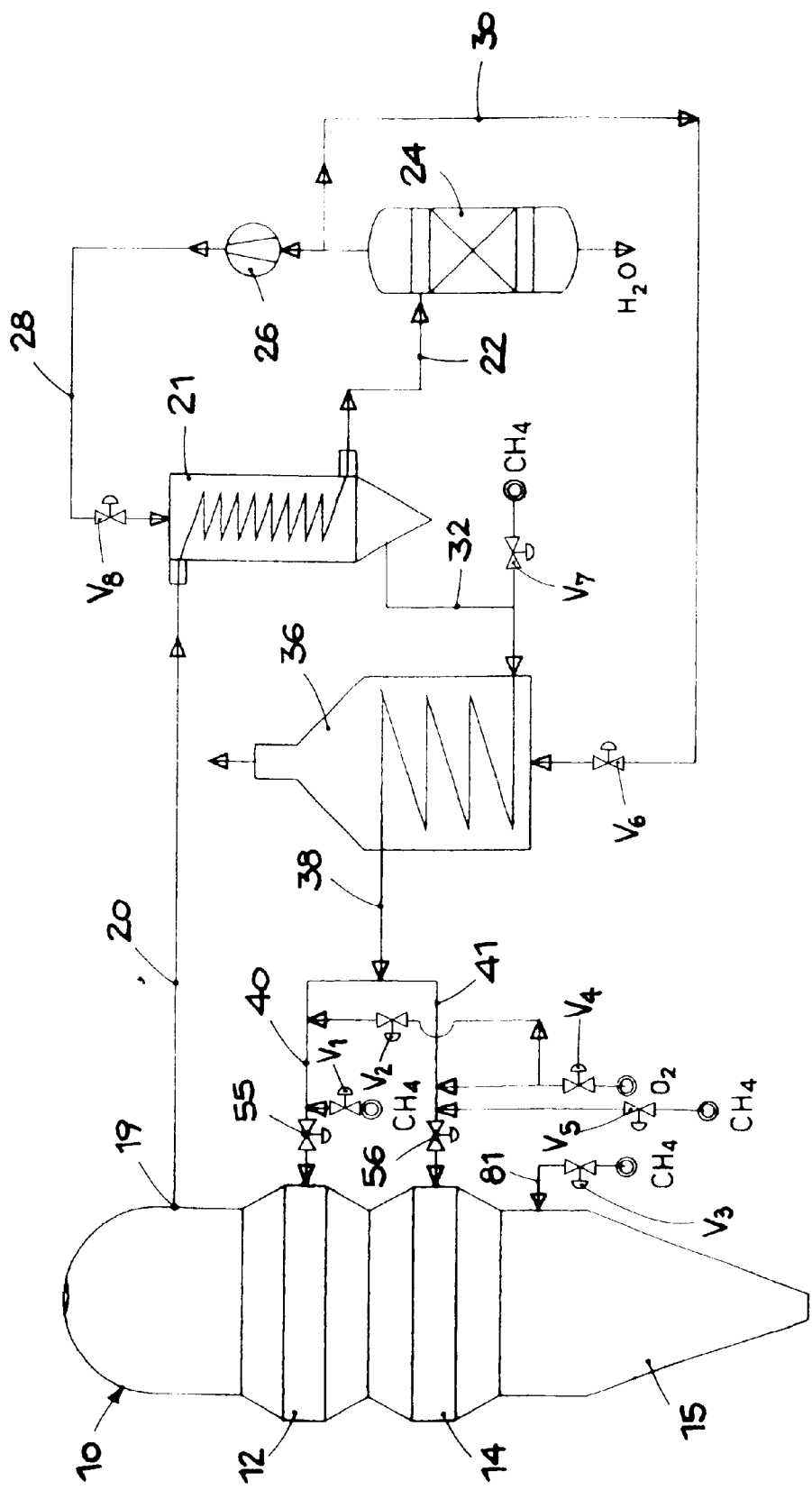

According to another variant, shown in FIG. 6, the reducing processing gas may be recircled without passing through a catalytic reformer, but a part of the gas exiting from the reduction furnace 10 is pre-heated in the exchanger 21 and, by means of the pipe 32, mixed with natural gas, for example $CH_4$, and sent to the pre-heater 36.

In this variant, the gas exiting the furnace 10 has a temperature of between 500° C. and 600° C. and has the following composition: $H_2$=30–36%, CO=20–25%, $CO_2$=20–25%, $CH_4$=2–7%, $H_2O$=15–25%; with an oxidation level of between 0.4 and 0.5.

The gas, thus pre-heated and mixed with natural gas, exits the pre-heater 36 at a temperature of between 650° C. and 950° C., it is subsequently divided into several currents of reducing gas, into each of which oxygen and natural gas are injected before they enter the reduction furnace 10, so as to raise the temperature of the inlet gases to a value of between 800° C. and 1150° C.

Another part of the gas exiting the reduction furnace 10 is used as fuel to generate heat in the pre-heater 36, by means of the pipe 30.

The reactions which take place in the reduction furnace 10 are to pre-heat and pre-reduce the mineral in the upper zone 12 and to reduce the Wustite (FeO) with $CH_4$, $H_2$ and CO in the reduction zone 14.

In a variant, $CH_4$ may be injected into the zone between the reduction zone 14 and the truncated-cone-shaped discharge end 15; in this way the $CH_4$ is pre-heated, cools the reduced material, and arrives in the reduction zone 14 cooperating with the methane contained in the reducing gas injected in the reaction zone 14.

With this system it is possible to eliminate the catalytic reformer 44, and at the same time the plurality of gas inlets allows to improve the profile of the temperature of the reduction furnace 10, making it more uniform and accelerating the reduction reactions.

Obviously, it is possible to make modifications and additions to the method for the direct reduction of mineral iron and the relative apparatus as described heretofore, but these will remain within the field and scope of the invention.

What is claimed is:

1. Method for the direct reduction of mineral iron inside a vertical reduction furnace, comprising the following steps: feeding the mineral iron into an upper portion of the furnace and allowing the mineral iron to flow through the furnace by force of gravity, injecting a mixture of high temperature reducing gas based on $H_2$ and CO into at least a reduction zone the furnace, said reducing gas flowing in counter-flow with respect to said mineral iron introduced into the furnace to produce reduced mineral iron and a process gas, removing the process gas from above the reduction zone of said furnace, and removing the reduced mineral iron from a lower part of said furnace, splitting said process gas into first and second parts, directing the first part of the process gas to a pre-heater and directing the second part of the process gas to a reforming circuit for being reformed, mixing a pre-heated gas emerging from said pre-heater and a reformed gas emerging from said reforming circuit to form a mixed gas, and adding at least one additional hydrocarbon gas component to said mixed gas to form said reducing gas that is injected into the furnace.

2. Method as in claim 1, characterised in that at least said first part of said process gas is washed in water, cooled and subjected to a substantial reduction of the quantity of water contained therein before being directed to said pre-heater.

3. Method as in claim 1, characterised in that, said pre-heater increases the temperature of said first part of said process gas to a temperature of between 650 and 950° C.

4. Method as in claim 1, characterised in that said mixed gas is further mixed with $O_2$ or air enriched with $O_2$.

5. Method as in claim 1, characterised in that, before introduced into the furnace, said mixed gas is further mixed with $O_2$ or air enriched with $O_2$ in order to achieve the partial combustion of the $H_2$ and the CO present in the reducing gas and thus raise the temperature in the reduction zone of the furnace to values of between 1000 and 1150° C.

6. Method as in claim 1, characterised in that said hydrocarbon is $CH_4$.

7. Method as in claim 1, characterised in that the step of injecting the mixture of high temperature reducing gas comprises injecting said reducing gas into at least two zones of said furnace arranged one above the other so as to achieve, in a controlled manner, a first zone of pre-heating and pre-reduction in the upper part of the furnace and a second zone of final reduction in the lower part of the furnace.

8. Method as in claim 6, characterised in that said methane represents between 6 and 20% in volume of said reducing gas.

9. Method as in claim 7, further comprising controlling percentages of the reducing gas in the at least two zones of said furnace.

10. Method as in claim 7, characterized in that said hydrocarbon comprises natural gas and in that said hydrocarbon in said mixed gas is proportioned independently in the at least two zones along the length of said furnace.

11. Method as in claim 7, further comprising independently heating said mixed gas in the at least two zones along the length of said furnace.

12. Method as in claim 1, characterised in that the reducing gas injected into said reactor has an oxidation level of between 0.06 and 0.25.

13. Method as in claim 7, characterised in that further $CH_4$ is partly injected into said furnace in a zone below said second zone.

* * * * *